United States Patent
Freitag et al.

(10) Patent No.: US 9,527,984 B2
(45) Date of Patent: *Dec. 27, 2016

(54) POLYPHOSPHONATE AND COPOLYPHOSPHONATE ADDITIVE MIXTURES

(71) Applicant: FRX POLYMERS, INC., Chelmsford, MA (US)

(72) Inventors: Dieter Freitag, Krefeld (DE); Jan-Pleun Lens, Reading, MA (US); Marc-Andre Lebel, Boxborough, MA (US)

(73) Assignee: FRX Polymers, Inc., Chelmsford, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/642,123

(22) Filed: Mar. 9, 2015

(65) Prior Publication Data

US 2015/0175777 A1   Jun. 25, 2015

Related U.S. Application Data

(63) Continuation of application No. 13/448,031, filed on Apr. 16, 2012, now Pat. No. 8,975,367.

(60) Provisional application No. 61/475,500, filed on Apr. 14, 2011.

(51) Int. Cl.

| | | |
|---|---|---|
| *C08G 79/04* | (2006.01) | |
| *C08K 5/42* | (2006.01) | |
| *C08J 3/20* | (2006.01) | |
| *C08L 85/02* | (2006.01) | |
| *C08J 3/00* | (2006.01) | |
| *C08G 64/08* | (2006.01) | |
| *C08L 69/00* | (2006.01) | |
| *C08G 79/02* | (2016.01) | |

(52) U.S. Cl.
CPC ............ *C08K 5/42* (2013.01); *C08G 64/083* (2013.01); *C08G 79/04* (2013.01); *C08J 3/005* (2013.01); *C08J 3/20* (2013.01); *C08J 3/203* (2013.01); *C08L 69/00* (2013.01); *C08L 85/02* (2013.01); *C08J 2369/00* (2013.01); *C08J 2385/02* (2013.01)

(58) Field of Classification Search
CPC ...................................................... C08G 79/04
USPC ................................. 528/398; 524/162, 165
See application file for complete search history.

(56) References Cited

U.S. PATENT DOCUMENTS

| | | |
|---|---|---|
| 3,940,366 A | 2/1976 | Mark |
| 4,331,614 A | 5/1982 | Schmidt et al. |
| 4,401,802 A | 8/1983 | Schmidt et al. |
| 4,481,350 A | 11/1984 | Schmidt et al. |
| 6,346,574 B1 | 2/2002 | Nishihara |
| 6,518,347 B1 | 2/2003 | Boyd et al. |
| 6,861,499 B2 | 3/2005 | Vinciguerra et al. |
| 7,645,850 B2 | 1/2010 | Freitag |
| 7,816,486 B2 | 10/2010 | Freitag et al. |
| 8,975,367 B2 * | 3/2015 | Freitag ............... C08J 3/203 528/167 |
| 2007/0129511 A1 | 6/2007 | Freitag |
| 2007/0203275 A1 | 8/2007 | Kikuchi et al. |
| 2009/0043013 A1 | 2/2009 | Stahl et al. |
| 2010/0298475 A1 | 11/2010 | Wilson et al. |

FOREIGN PATENT DOCUMENTS

| | | |
|---|---|---|
| EP | 0383978 A1 | 8/1990 |
| EP | 2404968 A1 | 1/2012 |
| WO | WO 01/83606 A1 | 2/2001 |
| WO | WO 2004/076536 | 2/2004 |
| WO | WO 2007/022008 A2 | 2/2007 |
| WO | WO 2009/018336 A2 | 2/2009 |
| WO | WO 2012/037500 A2 | 3/2012 |

OTHER PUBLICATIONS

Cotter, et al., Engineering Plastics: A Handbook of Polyarylethers, Gordon and Breach Science Publ. S.A., Switzerland (1995) (TOC).
Supplementary European Search Report of EP12770642 dated Jul. 20, 2015.

* cited by examiner

*Primary Examiner* — Duc Truong
(74) *Attorney, Agent, or Firm* — Pepper Hamilton LLP

(57) ABSTRACT

Disclosed are polymer compositions including polycarbonates, polyphosphonates, copoly(phosphonate carbonate)s, and organic salts and/or silicone containing compounds that exhibit a superior combination of properties compared to prior art.

9 Claims, No Drawings

POLYPHOSPHONATE AND COPOLYPHOSPHONATE ADDITIVE MIXTURES

CROSS-REFERENCE TO RELATED APPLICATIONS

This application is a continuation of U.S. application Ser. No. 13/448,031 entitled "Polyphosphonates and Copolyphosphonates with Additive Mixtures," filed Apr. 16, 2012, now U.S. Pat. No. 8,975,367 issued Mar. 10, 2015, which claims benefit of priority to U.S. Provisional Patent Application No. 61/475,500 filed on Apr. 14, 2011 entitled "Polyphosphonate And Copoly(Phosphonate Carbonate) Additive Mixtures," the entire contents of which are hereby incorporated by reference in their entireties.

GOVERNMENT INTERESTS

Not applicable

PARTIES TO A JOINT RESEARCH AGREEMENT

Not applicable

INCORPORATION BY REFERENCE OF MATERIAL SUBMITTED ON A COMPACT DISC

Not applicable

BACKGROUND

Not applicable

SUMMARY OF THE INVENTION

Embodiments include polymer compositions may including one or more polyphosphonate or one or more copolyphosphonate and one or more organic salts. Other embodiments are directed to articles of manufacture prepared from a polymer compositions having one or more polyphosphonate or one or more copolyphosphonate and one or more organic salts, and still other embodiments are directed to methods for preparing polymer compositions including compounding one or more polyphosphonate or one or more copolyphosphonate and one or more organic salts.

DESCRIPTION OF DRAWINGS

Not applicable

DETAILED DESCRIPTION

The above summary of the present invention is not intended to describe each illustrated embodiment or every possible implementation of the present invention. The detailed description, which follows, particularly exemplifies these embodiments.

Before the present compositions and methods are described, it is to be understood that they are not limited to the particular compositions, methodologies or protocols described, as these may vary. It is also to be understood that the terminology used in the description is for the purpose of describing the particular versions or embodiments only, and is not intended to limit their scope which will be limited only by the appended claims.

It must also be noted that as used herein and in the appended claims, the singular forms "a", "an", and "the" include plural reference unless the context clearly dictates otherwise. Unless defined otherwise, all technical and scientific terms used herein have the same meanings as commonly understood by one of ordinary skill in the art. Although any methods and materials similar or equivalent to those described herein can be used in the practice or testing of embodiments disclosed, the preferred methods, devices, and materials are now described.

"Optional" or "optionally" means that the subsequently described event or circumstance may or may not occur, and that the description includes instances where the event occurs and instances where it does not.

"Substantially no" means that the subsequently described event may occur at most about less than 10% of the time or the subsequently described component may be at most about less than 10% of the total composition, in some embodiments, and in others, at most about less than 5%, and in still others at most about less than 1%.

The term "alkyl" or "alkyl group" refers to a branched or unbranched hydrocarbon or group of 1 to 20 carbon atoms, such as but not limited to methyl, ethyl, n-propyl, isopropyl, n-butyl, isobutyl, t-butyl, octyl, decyl, tetradecyl, hexadecyl, eicosyl, tetracosyl and the like. "Cycloalkyl" or "cycloalkyl groups" are branched or unbranched hydrocarbons in which all or some of the carbons are arranged in a ring, such as but not limited to cyclopentyl, cyclohexyl, methylcyclohexyl and the like. The term "lower alkyl" includes an alkyl group of 1 to 10 carbon atoms.

The term "aryl" or "aryl group" refers to monovalent aromatic hydrocarbon radicals or groups consisting of one or more fused rings in which at least one ring is aromatic in nature. Aryls may include but are not limited to phenyl, napthyl, biphenyl ring systems and the like. The aryl group may be unsubstituted or substituted with a variety of substituents including, but not limited to, alkyl, alkenyl, halide, benzylic, alkyl or aromatic ether, nitro, cyano and the like and combinations thereof.

"Substituent" refers to a molecular group that replaces a hydrogen in a compound and may include, but are not limited to, trifluoromethyl, nitro, cyano, $C_1$-$C_{20}$ alkyl, aromatic or aryl, halide (F, Cl, Br, I), $C_1$-$C_{20}$ alkyl ether, benzyl halide, benzyl ether, aromatic or aryl ether, hydroxy, alkoxy, amino, alkylamino (—NHR'), dialkylamino (—NR'R") or other groups which do not interfere with the formation of the diaryl alkylphosphonate.

As defined herein, an "arylol" or an "arylol group" is an aryl group with a hydroxyl, OH, group substituent on the aryl ring. Non-limiting examples of an arylol are phenol, naphthalenol and the like. A wide variety of arlyols may be used in the embodiments of the invention and are commercially available.

The term "alkanol" or "alkanol group" refers to a compound including an alkyl of 1 to 20 carbon atoms or more having at least one hydroxyl group substituent. Examples of alkanols include but are not limited to methanol, ethanol, 1- and 2-propanol, 1,1-dimethylethanol, hexanol, octanol and the like. Alkanol groups may be optionally substituted with substituents as described above.

The term "alkenol" or "alkenol group" refers to a compound including an alkene of 2 to 20 carbon atoms or more having at least one hydroxyl group substituent. The hydroxyl may be arranged in either isomeric configuration (cis or trans). Alkenols may be further substituted with one or more substituents as described above and may be used in place of alkanols in some embodiments of the invention. Alkenols are known to those skilled in the art and many are readily available commercially.

The terms "flame retardant," "flame resistant," "fire resistant," or "fire resistance," as used herein, means that the composition exhibits a limiting oxygen index (LOI) of at least 27. "Flame retardant," "flame resistant," "fire resistant," or "fire resistance," may also be tested by measuring the after-burning time in accordance with the UL test (Subject 94). In this test, the tested materials are given classifications of UL-94 V-0, UL-94 V-1 and UL-94 V-2 on the basis of the results obtained with the ten test specimens. Briefly, the criteria for each of these UL-94-V-classifications are as follows:

UL-94 V-0: the total flaming combustion for each specimen after removal of the ignition flame should not exceed 10 seconds and the total flaming combustion for 5 specimens should not exceed 50 seconds. None of the test specimens should release any drips which ignite absorbent cotton wool.

UL-94 V-1: the total flaming combustion for each specimen after removal of the ignition flame should not exceed 30 seconds and the total flaming combustion for 5 specimens should not exceed 250 seconds. None of the test specimens should release any drips which ignite absorbent cotton wool.

UL-94 V-2: the total flaming combustion for each specimen after removal of the ignition flame should not exceed 30 seconds and the total flaming combustion for 5 specimens should not exceed 250 seconds. Test specimens may release flaming particles, which ignite absorbent cotton wool.

Fire resistance may also be tested by measuring after-burning time. These test methods provide a laboratory test procedure for measuring and comparing the surface flammability of materials when exposed to a prescribed level of radiant heat energy to measure the surface flammability of materials when exposed to fire. The test is conducted using small specimens that are representative, to the extent possible, of the material or assembly being evaluated. The rate at which flames travel along surfaces depends upon the physical and thermal properties of the material, product or assembly under test, the specimen mounting method and orientation, the type and level of fire or heat exposure, the availability of air, and properties of the surrounding enclosure. If different test conditions are substituted or the end-use conditions are changed, it may not always be possible by or from this test to predict changes in the fire-test-response characteristics measured. Therefore, the results are valid only for the fire test exposure conditions described in this procedure.

The state-of-the-art approach to rendering polymers flame retardant is to use additives such as brominated compounds or compounds containing aluminum and/or phosphorus. Use of the additives with polymer can have a deleterious effect on the processing characteristics and/or the mechanical performance of articles produced from them. In addition, some of these compounds are toxic, and can leach into the environment over time making their use less desirable. In some countries, certain brominated additives are being phased-out of use because of environmental concerns.

The term "hydrolytic stability," as used herein, is defined as the ability of the polymer to resist hydrolysis in a water boil test. The ability to resist hydrolysis can be measured by the change in relative viscosity after exposure which is an indication in molecular weight change. For example, a neat resin sample can be placed in pure water (triple distilled) for up to 168 hours under reflux conditions at normal pressure. The samples can be removed periodically, and the relative viscosity ($\eta_{rel}$) can be determined by dissolving the sample in dichloromethane at 25° C. at a concentration of 0.5 g polymer/liter and measuring the solution with an Ubbelohde viscometer. A significant change in the $\eta_{rel}$ value after the water boils is indicative of a change in molecular weight of the polymer due to hydrolysis. A polymer with good hydrolytic stability would not exhibit a significant change in $\eta_{rel}$ as a result of this test.

"Molecular weight," as used herein, can be determined by relative viscosity and/or gel permeation chromatography (GPC). "Relative viscosity" of a polymer is measured by dissolving a known quantity of polymer in a solvent and comparing the time it takes for this solution and the neat solvent to travel through a specially designed capillary (viscometer) at a constant temperature. Relative viscosity is a measurement that is indicative of the molecular weight of a polymer. It is also well known that a reduction in relative viscosity is indicative of a reduction in molecular weight, and reduction in molecular weight causes loss of mechanical properties such as strength and toughness. GPC provides information about the molecular weight and molecular weight distribution of a polymer. It is known that the molecular weight distribution of a polymer is important to properties such as thermo-oxidative stability (due to different amount of end groups), toughness, melt flow, and fire resistance, for example, low molecular weight polymers drip more when burned.

The term "toughness", as used herein, is determined qualitatively on a film or a molded specimen.

Polycarbonates (PC) are outstanding engineering thermoplastics that have an excellent combination of properties, such as, high heat distortion temperature (HDT), low color, transparency, melt processability, and outstanding toughness. These materials are used in a wide variety of applications and are produced commercially on an enormous scale. However, polycarbonates lack the requisite flame resistance, and there is a demand and still a need for flame resistant PCs that also maintain their other advantageous properties. A variety of approaches have been undertaken to impart flame resistance to these materials, but these approaches have been unsuccessful largely because they detract from the important inherent properties that PCs possess.

Embodiments of the invention generally relate to polymer compositions including a mixture of one or more polyphosphonate and one or more organic salts and, in some embodiments, one or more polyphosphonate, one or more polycarbonate, and one or more organic salts. Other embodiments are directed to one or more copolyphosphonates and one or more organic salts and in further embodiments, one or more copolyphosphonates, one or more polycarbonates, and one or more organic salts. Yet other embodiments are directed to one or more polycarbonates, one or more copolyphosphonates, and one or more organic salts.

In further embodiments, these mixtures may further include an additional polymer, and in other embodiments, these mixtures, which may or may not include an additional polymer, may also include one or more silicon containing compounds. The copolyphosphonate s of various embodiments can be either random copolymers in which monomers of the copolyphosphonates of various embodiments are incorporated into polymer chain randomly or block copolymers in which polycarbonate portions and polyphosphonate portions of the copolymer are covalently linked. The polymer compositions of the invention generally provide improved flame resistance over polymer compositions including polycarbonate or copolycarbonate alone or mixtures of polycarbonate or copolycarbonate with organic salts. This improvement is better than would be expected based on the additive effect of a mixture including polycarbonates, polyphosphonates, and organic salts. Thus, these mixtures may exhibit synergistic effects.

The polyphosphonates useful in embodiments may be any polyphosphonates known in the art including, but not limited to, those described U.S. Pat. No. 6,861,499 and U.S. Pat. No. 7,816,486, both of which are hereby incorporated by reference in their entireties. In certain embodiments, the polyphosphonates may be characterized as exhibiting at least one, and preferably all of a broad molecular weight distribution with polydispersities of 3.2 or greater, 2.5 or greater, and 2.3 or greater, an $M_w$ of greater than about 10,000 using polystyrene standards, and a $T_g$ of at least 100° C. In some embodiments, the polyphosphonates may have a $T_g$ of about 25° C. to about 140° C., about 50° C. to about 135° C., or about 75° C. to about 130° C. In particular embodiments, the polyphosphonates may be prepared from a aryl phosphonic acid ester and bisphenol A or a mixture of bisphenol A and other bisphenols and a phosphonium catalyst or an alkyl metal catalyst such as a sodium catalyst, and may have a relative viscosity of at least 1.1, transparency, and improved hydrolytic stability. Such polyphosphates may be branched polyphosphonates or linear or cyclic.

In some embodiments, the amount of hydroxy aromatic to aryl phosphonic acid ester may be modified to affect properties of the polyphosphonates. For example, a polyphosphonate prepared using a phosphonium catalysts such as, for example, tetraphenyl phosphonium phenolate exhibits a $T_g$ of at least 100° C., at least 105° C., at least 110° C., at least about 120° C., at least about 130° C., or at least about 140° C. These polyphosphonates may exhibit a weight average molecular weight ($M_w$) ranging from about 10,000 g/mole to about 200,000 g/mole, about 12,000 g/mole to about 150,000 g/mole, about 15,000 g/mole to about 140,000 g/mole, about 20,000 g/mole to about 100,000 g/mole or any value between theses ranges based on polystyrene standards. In particular embodiments, the weight average molecular weight ($M_w$) of about 10,000 g/mole to about 100,000 g/mole. In general, such polyphosphonates may have a polymer dispersity of greater than about 3. In comparison, branched polyphosphonates prepared from the same monomers using sodium phenolate as catalyst, as disclosed in U.S. Pat. No. 4,331,614, exhibits a $T_g$ of only 90° C., an $M_n$ of 21,400 g/mole and a dispersity of less than 2.

The term "copolyphosphonate" as used herein is meant to encompass copoly(phosphonate carbonate)s and copoly(phosphonate esters) and include block copoly(phosphonate carbonate)s, random copoly(phosphonate carbonate)s, block copoly(phosphonate esters), and random copoly(phosphonate esters). The constituent components of such copolyphosphonates may include any type of phosphonate and carbonate components.

The random copolyphosphonate of various embodiments may be any random copolyphosphonate known in the art and include, for example, the random copolyphosphonates described in U.S. Provisional No. 61/383,697 and U.S. Provisional No. 61/383,686, both of which are hereby incorporated by reference in their entireties. In some embodiments, the random copolyphosphonates may be prepared from at least 20 mole % high purity optionally substituted diaryl alkylphosphonate, one or more diphenyl carbonate, and one or more bisphenol, wherein the mole percent of the high purity diaryl alkylphosphonate is based on the total amount of transesterification components, i.e., total diaryl alkylphosphonate and total diphenyl carbonate.

The phosphonate and carbonate content of the copolyphosphonates may vary among embodiments, and embodiments are not limited by the phosphonate and/or carbonate content or range of phosphonate and/or carbonate content. For example, in some embodiments, the copolyphosphonates may have a phosphorus content that is indicative of the phosphonate content of from about 1% to about 15% by weight of the total copolyphosphonate, and in other embodiments, the phosphorous content of the copolyphosphonates of the invention may be from about 2% to about 12% or about 4% to about 10% by weight of the total polymer.

The copolyphosphonates of various embodiments exhibit both a high molecular weight and a narrow molecular weight distribution (i.e., low polydispersity). For example, in some embodiments, the copolyphosphonates may have a weight average molecular weight ($M_w$) of about 10,000 g/mole to about 100,000 g/mole as determined by $\eta_{rel}$ or GPC using polystyrene standards, and in other embodiments, the copolyphosphonates may have a $M_w$ of from about 12,000 to about 80,000 g/mole as determined by $\eta_{rel}$ or GPC using polystyrene standards. The narrow molecular weight distribution (i.e., Mw/Mn) of such copolyphosphonates may be from about 2 to about 7 in some embodiments and from about 2 to about 5 in other embodiments. In still other embodiments, the random copolyphosphonates may have a relative viscosity of from about 1.0 to about 1.75, about 1.1 to about 1.5, about 1.2 to about 1.4, or any value between these exemplary ranges. In further embodiments, the copolyphosphonate may have a $T_g$ of about 25° C. to about 140° C., about 50° C. to about 135° C., or about 75° C. to about 130° C.

Without wishing to be bound by theory, the use of high purity diaryl alkylphosphonate or optionally substituted diaryl alkylphosphonate, and in particular embodiments, high purity diphenyl methylphosphonate (DPP), in the preparation of the copolyphosphonates of the invention may provide improved properties over random copolymers of the prior. The "high purity" optionally substituted diaryl alkylphosphonate and DPP of various embodiments may include total acidic components of less than about 0.15% by weight, less than about 0.10% by weight, and in certain embodiments, less than about 0.05% by weight. Such acidic components are known in the art and may include, but are not limited to, phosphoric acid, phosphonic acid, methyl phosphonic acid, and methyl phosphonic acid mono phenylester. In some embodiments, the random copolyphosphonates may include substantially no acidic component contaminants, and in other embodiments, the random copolyphosphonates may include, for example, total acidic components of less than about 0.15% by weight, less than about 0.10% by weight, and in certain embodiments, less than about 0.05% by weight.

The random copolyphosphonates of the invention generally exhibit high molecular weight and narrow molecular weight distribution, which in-turn, may impart a superior combination of properties. For example, the random copolyphosphonates of embodiments are generally tough, extremely flame retardant, and exhibit superior hydrolytic stability. In addition, the copolyphosphonates of embodiments generally exhibit an excellent combination of processing characteristics including, for example, good thermal and mechanical properties.

The block copolyphosphonates useful in embodiments of the invention may be any block copolyphosphonate known in the art. For example, the block copoly(phosphonate carbonate)s and block copoly(phosphonate ester)s may be those described in U.S. Pat. No. 7,645,850, which is hereby incorporated by reference in its entirety. In general, the block copolyphosphonates may include at least one phosphonate oligomer or polyphosphonate and one or more oligoester or polyester or oligocarbonate or polycarbonate covalently linked to the at least one phosphonate oligomer or polyphosphonate to form a poly(block-phosphonato-ester) or poly(block-phosphonato-cabonate). In some embodiments, the at least one phosphonate oligomer or poly phosphonate and one or more polyester or polycarbonate may be linked to one another by transesterification or polycondensation, and in certain embodiments, the poly(block-phosphonato-ester) and/or poly(block-phosphonato-cabonate) may have a single glass transition temperature ($T_g$).

The phosphonate oligomer or polyphosphonate of the block copolyphosphonates before incorporation into the block copolyphosphonate may have a solution viscosity ($\eta_{rel}$) of from about 1.03 to greater than about 1.35 and may have a $T_g$ of from about 25° C. to about 140° C. In some embodiments the phosphonate oligomer or polyphosphonate may be branched or linear and can be prepared with up to about 50 mol. % branching agent. In other embodiments, the phosphonate oligomer of polyphosphonate may have a molecular weight ($M_w$) of from about 2,000 g/mol to about 35,000 g/mol, and, in certain embodiments, the phosphonate oligomer or polyphosphonate may be prepared from at least a stoichiometrically imbalanced mixture of a phosphoric acid diaryl ester and a bisphenol.

Either commercial or custom synthesized branched or linear polycarbonates may be suitable for use in embodiments of the invention. In some embodiments the polycarbonates may have a relative viscosity ($\eta_{rel}$) of at least about 1.2 or from about 1.02 to about 1.2 in certain embodiments. Non-limiting examples of commercially available polycarbonates may be those available under the trade names Lexan (General Electric Company), Makrolon (Bayer AG), Apec (Bayer AG), Hiloy (ComAlloy), Calibre (Dow Chemical Co.), Lupilonx (Mitsubishi), Naxell (MRC Polymers), Edgetek (PolyOne), Trirex (Kasei) and Panlite (Teijin Chemicals). It should be understood that any polycarbonate available now or in the future may be used in embodiments of the method presented herein.

Custom polycarbonates may be prepared by any method known in the art. For example, custom polycarbonates may be synthesized from diphenyl carbonate and any known bisphenol using a transesterification catalyst, and in the case of branched polycarbonates, a branching agent, or by an interfacial polycondensation process using phosgene and any bisphenol with or without a branching agent. A variety of bisphenols can be used in such reactions, and a compilation of known bisphenols readily available and well known to those skilled in the art including those containing heterocyclic structures can be found in "Engineering Plastics: A Handbook of Polyarylethers" by Robert J. Cotter, Gordon and Breach Science Publishers S.A., Switzerland 1995. For example, bisphenols may include, but are not limited to, resorcinol, hydroquinone, 4,4'-biphenol, 2,2-bis(4-hydroxyphenyl)propane (bisphenol A), 3,3'-biphenol, 4,4'-dihydroxyphenyl ether, 4,4'-dihydroxydiphenylsulfone, 9,9-dihydroxyphenyl fluorine, 1,1-bis(4-hydroxyphenyl)-3,3-dimethyl-5-methylcyclohexane, 4,4'-dihydroxybenzophenone, 4,4'-dihydroxyphenyl sulfide, 1-methyl-1-phenyl bis(4-hydroxyphenyl)methane, bis(3-hydroxyphenyl)methane, bis(4-hydroxyphenyl)methane, 9,9-bis(3-methyl-4-hydroxyphenyl)fluorene, 9,9-bis(3,5-dimethyl-4-hydroxyphenyl)fluorine, 1,4-bis[(4-hydroxyphenyl)-2-propyl]benzene, 1,4-bis[(4-hydroxyphenyl)-3,5 dimethylphenyl]-2-propyl]benzene, 4,4'-bis(4-hydroxyphenyl)diphenyl methane, 2,2-bis(4-hydroxyphenyl)hexafluoroisopropylidene, 1-trifluoromethyl-1-phenyl bis(4-hydroxyphenyl)methane and combinations thereof.

Any organic salt known in the art may be used in polymer compositions embodied and described herein. An "organic salt," as used herein, encompasses any compound formed by the reaction between an organic acid and an inorganic base. All such organic acids are encompassed by various embodiments. In certain embodiments, the organic salt may be a "sulfonic acid," which, as defined herein encompasses organic compounds including the structure R—SO$_2$OH, in which the sulfur atom, S, is bonded to a carbon atom that may be part of a large aliphatic or aromatic hydrocarbon, R, and also bonded to three oxygen atoms, O, one of which has a hydrogen atom, H, attached to it. The hydrogen atom makes the compound acidic, much as the hydrogen of a carboxylic acid. However, carboxylic acids are weak (with dissociation constants of about $10^{-5}$), sulfonic acids are considered strong acids (with dissociation constants of about $10^{-2}$).

In various exemplary embodiments, the organic salt may be the salts identified in U.S. Pat. No. 3,940,366, which is hereby incorporated by reference in its entirety. Exemplary organic salts include, but are not limited to, sodium 2,5-difluorobenzenesulfonate, sodium 2,4,5-tribromobenzenesulfonate, sodium p-iodobenzenesulfonate, sodium 2,4-dibromo-5-fluorobenzenesulfonate, calcium 2,5-dichlorobenzenesulfonate, disodium 2,5-dichlorobenzene-1,3-disulfonate, sodium 4,4'-dibromobiphenyl-3-sulfonate, disodium 1,4-dichloronaphthalene-x,y-disulfonate, disodium 2,2-dichloro-1,1-bis(4'-chloro-phenyl)ethylene-3',3"-disulfonate, Sodium 2,4-dinitrobenzenesulfonate, calcium 2-chloro-5-nitrobenzenesulfonate, calcium 3-(trifluoromethyl)benzenesulfonate, sodium 3-bromo-5-(trifluoromethyl)benzenesulfonate, lithium 2,4,5-trichlorobenzenesulfonate, lithium p-bromobenzenesulfonate, barium 2,4,5-trichlorobenzenesulfonate, potassium 4-chloro-3-nitrobenzenesulfonate, magnesium 2,4,5-trichlorobenzenesulfonate, strontium 2,4,5-trichlorobenzenesulfonate, sodium 2-chloro-4-cyanobenzenesulfonate, calcium 3-chloro-4-methylbenzenesulfonate, sodium 4-chloro-3-methylbenzenesulfonate, sodium 3,5-dichloro-2-methylbenzenesulfonate, sodium 3-(trifluoromethyl)-5-(arpentachlorobenzyl)benzenesulfonate, sodium 2-chloro-4-(trifluorovinyl)benzenesulfonate, sodium 4'-bromo-α,α'-dichlorostilbenesulfonate, potassium tetrakis(4-chlorophenyl)ethylene-3-sulfonate, sodium 4,2',3',4',5',6',4"-heptachlorotriphenylmethane-3-sulfonate, disodium 1,1,1-trichloro-2-(4'-cyanophenyl)-2-(4-chlorophenyl) ethanesulfonate, sodium 2,2-bis(4'-chlorophenyl)-hexafluoropropane-3'-sulfonate, lithium 9,10-dichloroanthracenesulfonate, sodium 1,3,6,8-tetrachloropyrene-4-sulfonate, sodium 2,3-dichlorobenzenesulfonate, sodium 2,3,4-trichlorobenzenesulfonate, sodium pentachlorobenzenesulfonate, sodium 2,3,5,6-tetrachlorobenzenesulfonate, sodium 2,3,4,5-tetrabromobenzenesulfonate, trisodium 2,4,6-trichlorobenzene-1,3,5-trisulfonate, p-fluorobenzene sulfonic acid, 2,3,4,5-tetrafluorobenzenesulfonic acid, pentafluorobenzenesulfonic acid, p-chlorobenzenesulfonic acid, 2,4-dichlorobenzenesulfonic acid, p-bromobenzenesulfonic acid, 2,5-dibromobenzenesulfonic acid, 2-bromo-4-chlorobenzenesulfonic acid, 2-chloro-4-bromobenzenesulfonic acid, 2-bromo-5-chlorobenzenesulfonic acid, 2-chloro-5-bromobenzenesulfonic acid, 2,3,4- trichlorobenzenesulfonic acid, 2,4,6-trichlorobenzenesulfonic acid, 2,3,4,5-tetrachlorobenzenesulfonic acid, 2,3,5,6-tetrachlorobenzenesulfonic acid, 2,3,4,6-tetrachlorobenzenesulfonic acid, pentachlorobenzenesulfonic acid, 1-chloronaphthalene-x-sulfonic acid, 1,x-dichloronaphthalene-y-sulfonic acid, 1-bromonaphthalene-x-sulfonic acid, 4,5-dichlorobenzene-1,3-disulfonic acid, and combinations thereof. In other embodiments, the organic salts may be sodium or calcium salts of oligomeric or polymeric sulfonic acids such as, but not limited to, sodium or calcium salts of poly(monochlorostyrene)sulfonic acid containing one sulfonate group per 5.4 phenyl rings.

In particular embodiments, the organic salt may be potassium diphenylsulfone sulfonate (KSS) and sodium trichlorobenzene sulfonate (STB), potassium perfluorobutane sulfonate (KPFBS), p-toluenesulfonic acid sodium salt (NaTS), poly(styrenesulfonic acid sodium salt) and similar salts as described in U.S. Pat. No. 6,346,574, which is hereby incorporated by reference in its entirety, fluoroalkylsulfonamidate salts such as those described in U.S. Pat. No. 6,518,347, which is hereby incorporated by reference in its entirety, potassium 2,4,5-trichlorobenzene, potassium-2,4,5-trichlorobenzenesulfonate, and combinations thereof. Quantities of such organic salts known to be useful in the polymer arts are known in the art, and any concentration of organic salt sufficient to provide flame resistance may be used in embodiments. For example, in certain embodiments, the organic salts may be provided at about 0.01 wt. % to about 1.0 wt. %.

In further embodiments, a co-additive may be provided along with the organic salts to improve, for example, clarity of the resulting polymer and/or processability. Examples of co-additives that provide such properties include, but are not limited to, octaphenylcyclotetrasiloxane, poly(methyl siloxane), poly(methylphenyl siloxane), halogenated organic additives such as tetrabromobenzene, hexachlorobenzene, and hexabromobenzene, and biphenyls such as 2,2'-dichlorobiphenyl, 2,4'-dibromobiphenyl, 2,4'-dichlorobiphenyl, hexabromobiphenyl, octabromobiphenyl, decabromobiphenyl and halogenated diphenyl ethers, containing 2 to 10 halogen atoms. Generally, small quantities of such co-additives are necessary to produce the desired result. For example, in various embodiments, less than 1.0 wt. % or less than 0.5 wt. % of such co-additives may be provided in the polymer compositions.

Similarly, any known silicone-containing additive may be provided in the polymer compositions described herein. For example, in various embodiments, the silicone-containing additive may be octaphenylcyclotetrasiloxane, polymethylphenylsiloxane, polymethyl phenyl methoxy siloxane, poly(phenylsilsesquioxane), or any combination these or other silicone containing additives. The silicone-containing additive can be provided at any concentration sufficient to provide a beneficial effect, and the skilled artisan can determine this concentration using well-accepted methods. In certain exemplary embodiments, the concentration of silicone may be from about 0.001 wt. % to about 1.0 wt. %.

In some embodiments, the polymer compositions of the invention may further include one or more anti-dripping agents. Anti-dripping agents are well known in the art, and any anti-dripping agent may be used in the compositions described herein. For example, in particular embodiments, the anti-dripping agent may be one or more fluorinated polyolefins such as polytetrafluoroethylene or a blend of polytetrafluoroethylene and styrene acrylonitrile copolymer (TSAN). In such embodiments, the polytetrafluoroethylene may be provided at a concentration of from about 0.001 wt. % to about 1.0 wt. %, although the skilled artisan may provide more or less anti-dripping agent to produce the desired activity.

In still other embodiments, the polymer compositions described above including one or more copolyphosphonates, one or more polycarbonates, and one or more organic salts and/or, in some embodiments, a silicone containing compound may further include an additional polymer or engineering plastic. Additional polymers that may be combined with the polymer compositions described herein include, but are not limited to, plastics, polyacrylonitriles, polystyrenes, polyamides, glass filled or non-glass filled polyamides, more specifically, PA 6, PA 6.6, PA 4.6, polyesters, glass filled or non-glass filled polyester, more specifically, polyethylene terephthalate (PET), polybutylene terephthalate (PBT), poly(trimethylene terephthalate), polyurethanes, polyureas, polyepoxys, polyimides, polyarylate, poly(arylene ether), polyethylene, polyethylene oxide, polyphenylene sulfide, polypropylene, polyphenylene oxide (PPO), poly(vinyl ester), polyvinyl chloride, bismaleimide polymer, polyanhydride, polyacrylonitrile butadiene styrenes (ABS), ABS/PCs, high-impact polystyrenes (HIPS), PPO/HIPS, liquid crystalline polymer, cellulose polymer, or combinations thereof. The additional polymer may be blended with the polymer using any mixing, blending, or compounding method known in the art such as, but not limited to, melt mixing. Engineering plastics as used herein include, both thermoplastics and thermosetting resins and may include, but are not limited to, epoxies, derived polymers, polyepoxies (e.g., polymers resulting from the reaction of one or more epoxy monomer or oligomer with one or more chain extender or curing agent such as a mono or multifunctional phenol, amine, benzoxazine, anhydride or combination thereof), benzoxazines, polyacrylates, polyacrylonitriles, polyesters, such as, poly(ethylene terephthalate), poly(trimethylene terephthalate), and poly(butylene terephthalate), unsaturated polyesters, polyamides, polystyrenes including high impact strength polystyrene, polyureas, polyurethanes, polyphosphonates, polyphosphates, poly(acrylonitrile butadiene styrene)s, polyimides, polyarylates, poly(arylene ether)s, polyethylenes, polypropylenes, polyphenylene sulfides, poly(vinyl ester)s, polyvinyl chlorides, bismaleimide polymers, polyanhydrides, liquid crystalline polymers, cellulose polymers, or any combination thereof (commercially available from, for example, Sabic Plastics, Pittsfield, Mass.; Rohm & Haas Co., Philadelphia, Pa.; Bayer Corp.—Polymers, Akron, Ohio; Reichold; DuPont; Huntsman LLC, West Deptford, N.J.; BASF Corp., Mount Olive, N.J.; Dow Chemical Co., Midland, Mich.; GE Plastics; DuPont; Bayer; DuPont; ExxonMobil Chemical Corp., Houston, Tex.; ExxonMobil.; Mobay Chemical Corp., Kansas City, Kans.; Goodyear Chemical, Akron, Ohio; BASF Corp.; 3M Corp., St. Paul, Minn.; Solutia, Inc., St. Louis, Mo.; DuPont; and Eastman Chemical Co., Kingsport, Tenn., respectively). In particular embodiments, the copoly(phosphonate carbonate)s of the invention may be combined with polyepoxies.

In other embodiments, the polymer compositions described above, may include one or more additional components or additives commonly used in the art, such as, for example, fillers, fibers, surfactants, organic binders, polymeric binders, crosslinking agents, coupling agents, aramid fibres, lubricants, mould release agents such as pentaerythritol tetrasteatrate, nucleating agents, antistatic agents such as conductive blacks, carbon fibers, carbon nanotubes, and organic antistatic agents such as polyalkylene ethers, alkylsulfonates, and polyamide-containing polymers, catalysts, colorants, inks, dyes, antioxidants, stabilizers, impact agents, flame retardants, and the like and any combinations thereof. In such embodiments, the one or more additional components or additives may make up from about 0.001 wt. % to about 30 wt. %, about 0.05 wt. % to about 25 wt. %, about 0.5 wt. % to about 20 wt. %, about 1.0 wt. % to about 15 wt. %, or about 1.5 wt. % to about 10 wt. % based on the total composition.

In some embodiments, the polymer compositions described above can be used alone as an engineering polymer or as additives that are combined with other polymers to provide flame resistance without detracting from other important properties. Certain embodiments include articles of manufacture and coatings prepared from the polymer compositions of the invention alone or in combination with another polymer. In still other embodiments, engineering polymers of the polymer compositions may be combined with a reinforcement material such as, for example, glass, carbon, silicon carbide, organic fibers, and the like and combinations thereof to produce composites having an advantageous combination of fire resistance and dimensional stability while maintaining high HDT near that of the unmodified engineering polymer.

The polymer compositions described above including any of the components identified can be prepared by conventional means. For example, in some embodiments, the respective constituents can be mixed in a known manner and subjected to melt compounding and/or melt extrusion at temperatures such as about 200° C. to about 400° C. in customary aggregates such as internal kneaders, extruders, or twin-screw apparatuses. Mixing the individual constituents can be affected either successively or simultaneously and at about room temperature (about 20° C.) or at higher temperature. For example, in some embodiments, the copolyphosphonate, and organic salt and/or all additional components or additives can be introduced into the polycarbonate by compounding. In other embodiments, the individual constituents can be introduced separately in different stages of the preparation process into the melt copolyphosphonate or melt polycarbonate. The form of addition of the compounds according to the invention is not limited. For example, the engineering plastics and/or additional components or additives can be added as solids such as a powder, as concentrate in a polycarbonate powder solution. In industrial embodiments, a side extruder may be operated with a throughput of, for example, 200-1000 kg of the polymer composition per hour.

The polymer compositions of the invention can be used as coatings or adhesives or they can be used to fabricate articles, such as free-standing films, prepregs, fibers, foams, molded articles and fiber reinforced composites. In the case of fiber-reinforced composites, the reinforcement may be in the form of continuous, woven, or chopped fibers including, but not limited to, glass, carbon, silicon carbide, and organic fibers or combinations thereof. These articles may be well suited for a variety of applications as support parts, electrical components, electrical connectors, electrical housings, electrical covers, electrical insulators, printed wiring laminated boards, housings, covers, brackets, support structures, enclosures and subcomponents and components in consumer products that must meet UL or other standardized fire resistance standards.

The polymer compositions of the invention are generally self-extinguishing, i.e., they stop burning when removed from a flame and any drops produced by melting in a flame stop burning are almost instantly extinguished and do not readily propagate fire to any surrounding materials. Moreover, these polymer compositions do not evolve noticeable smoke when a flame is applied.

EXAMPLES

Although the present invention has been described in considerable detail with reference to certain preferred embodiments thereof, other versions are possible. Therefore the spirit and scope of the appended claims should not be limited to the description and the preferred versions contained within this specification. Various aspects of the present invention will be illustrated with reference to the following non-limiting examples.

Example 1

Preparation of Random Copoly(Phosphonato-Carbonate)

Into 250 L reactor equipped with a distillation column and mechanical stirrer was placed 75 kg (328.95 mol.) 2,2-bis-(4-hydroxyphenyl) propane (bisphenol A), 26.10 kg (105.24 mol.) high purity methylphosphonic acid diphenyl ester (DPP), 49.5 kg (231.31 mol.) diphenyl carbonate, and 55 g tetraphenylphosphonium phenolate (TPPOP) catalyst which is a chemical complex of tetraphenylphosphonium phenolate and phenol consisting of about 70% and about 30% of each, respectively (m.p 145° C.). Analysis of the DPP prior to performing this reaction indicated that this batch contained acidic 0.03% acidic components. The mixture was heated to 250° C. while reducing the pressure from 700 to 4 mm Hg over about 5 hours period. The distillate collected was 59.6 kg. The product of this mixture was oligo-carbonate-phosphonate.

Then the mixture was heated from 250 to 300° C. while reducing the pressure from 10 to 1.5 mm Hg over about 5 hours period. Approximately 3 kg of distillate was collected over the course of this reaction. The random copoly(phosphonato-carbonate) product was extruded out of reactor into a water bath to form a strand that was subsequently palletized. The yield of the copolymer product out of the reactor was 79.3 kg of a transparent, yellowish color, and tough random copolymer. The characterization data were listed in Table below.

TABLE 1

| Composition & characterization data: | |
|---|---|
| Example # | 1 |
| Composition | |
| BPA [kg] | 75 |
| DPC [kg] | 49.5 |
| DPP [kg] | 26.1 |
| TPPP [g] | 55 |
| NaPh [ g] | |
| acidic components* in DPP [%] | 0.02 |
| DPP/(DPP + DPC) [mass.-%] | 34.5 |
| DPP/(DPP + DPC) [mol-%] | 31.3 |
| (DPP + DPC)/BPA [mol/mol] | 1.023 |
| appearance | granule |
| Tg | 125 |
| Based on PS standard | |
| Mw | 55000 |
| Mn | 20000 |
| PD | 2.75 |

Example 2

Compounding of Random Copoly(Phosphonato-Carbonate)

Various polymer compositions including poly carbonate (PC) or random copolyphosphonate having 35 mol. % phosphonate (CO 35), and potassium perfluorobutane sulfonate (Rimar salt) or 3-Phenylsulfonylbenzenesulfonic acid potassium salt (KSS) were prepared. The components were combined in the amounts provided in TABLE 4, and the compositions were compounded in Werner and Pfleider, ZS B25 extruder with regular PC screw configuration. Compounding conditions are provided in TABLE 2:

TABLE 2

| | set condition for | |
|---|---|---|
| Compounding condition | Examples with ≥ 50% PC 121 R | Examples with > 50% CO 35 |
| Temperature profile (C.) | | |
| Zone 1 | 220 | 220 |
| Zone2 | 220 | 220 |
| Zone 3 | 220 | 225 |
| Zone 4 | 235 | 230 |
| Zone 5 | 235 | 235 |
| Adapter | 240 | 240 |
| Die | 240 | 245 |
| Melt Temp (C.) | 230 | 230 |
| Extrusion rate (lb/hr) | 12-15 | 12-15 |

Test samples were molded in 30T Trubor, 30-RS-1½ oz injection molder. Conditions for molding are provided in TABLE 3.

TABLE 3

| Molding condition | Set condition |
|---|---|
| Temperature profile (F.) | |
| Zone 1 | 450 |
| Zone2 | 450 |
| Adapter | 450 |
| Nozzle | 460 |
| Mold Open (sec) | 1 |
| Mold Close (sec) | 67 |
| Injection Forward (sec) | 1.1 |
| Boost (sec) | 1.2 |
| Intrusion (sec) | 0.9 |

TABLE 4

| Ingredient | 1 | 2 | 3 | 4 | 5 | 6 | 7 | 8 | 9 | 10 | 11 | 12 |
|---|---|---|---|---|---|---|---|---|---|---|---|---|
| PC | 100 | 99.92 | | | | | | | | | | |
| FRX CO35 | | | 100 | 99.92 | 99.92 | 99.84 | 99.92 | 99.84 | 99.90 | 99.60 | 99.82 | 99.52 |
| Rimar Salt | | 0.08 | | 0.08 | | | 0.04 | 0.08 | | | 0.08 | |
| KSS | | | | | 0.08 | 0.16 | 0.04 | 0.08 | | | | 0.08 |
| Octaphenylcyclo-tetrasiloxane | | | | | | | | | 0.10 | 0.40 | 0.10 | 0.40 |
| Total | 100 | 100 | 100 | 100 | 100 | 100 | 100 | 100 | 100 | 100 | 100 | 100 |
| UL94, 1.6 mm | | | | | | | | | | | | |
| Max burn time (s) | 16 | 4 | <1 | <1 | <1 | <1 | <1 | 2 | | | | |
| Total burn time (s) | 53 | 24 | <1 | <1 | <1 | <1 | <1 | 3 | | | | |
| Drips 1st (#) | 20 | 0 | 0 | 0 | 0 | 0 | 0 | 0 | | | | |
| Ign 1st (#) | 3 | 0 | 0 | 0 | 0 | 0 | 0 | 0 | | | | |
| Drips 2nd (#) | 2 | 6 | 22 | 14 | 7 | 7 | 7 | 10 | | | | |
| Ign 2nd (#) | 2 | 0 | 0 | 0 | 0 | 0 | 0 | 0 | | | | |
| Rating | — | V0 | V0 | V0 | V0 | V0 | V0 | V0 | | | | |
| UL94, 0.8 mm | | | | | | | | | | | | |
| Max burn time (s) | burn | 3 | 5 | 6 | 4 | 4 | 3 | 4 | | | | |
| Total burn time (s) | burn | 15 | 23 | 26 | 17 | 17 | 15 | 15 | | | | |
| Drips 1st (#) | 0 | 0 | 0 | 1 | 3 | 1 | 2 | 2 | | | | |
| Ign 1st (#) | 0 | 0 | 0 | 0 | 0 | 0 | 0 | 0 | | | | |
| Drips 2nd (#) | | 9 | 13 | 12 | 17 | 22 | 12 | 12 | | | | |
| Ign 2nd (#) | | 0 | 0 | 0 | 0 | 0 | 0 | 0 | | | | |
| Rating | — | V0 | V0 | V0 | V0 | V0 | V0 | V0 | | | | |
| UL94, 0.4 mm | | | | | | | | | | | | |
| Max burn time (s) | burn | 3 | 7 | 6 | 4 | 1 | 4 | 4 | | | | |
| Total burn time (s) | burn | 12 | 26 | 22 | 22 | 5 | 17 | 18 | | | | |
| Drips 1st (#) | 0 | 5 | 11 | 6 | 12 | 5 | 10 | 9 | | | | |
| Ign 1st (#) | 0 | 5 | 0 | 0 | 0 | 5 | 0 | 0 | | | | |
| Drips 2nd (#) | | NA | 16 | 12 | 17 | NA | 16 | 25 | | | | |
| Ign 2nd (#) | | NA | 0 | 0 | 0 | NA | 0 | 0 | | | | |
| Rating | — | V-2 | V0 | V0 | V0 | V-2 | V0 | V0 | | | | |

As indicated in TABLE 4, polycarbonate (PC) test samples burned easily at all thicknesses tested, whereas CO35 alone exhibited a UL-94 rating of V-0 and showed good flame retardancy. The addition of Rimar salt or KSS improved the flame retardancy of PC to provide a UL-94 rating of V-0 at 1.6 mm and 0.8 mm thicknesses, but provided a UL-94 rating of V-2 at test thicknesses of 0.4 mm. These data suggest that the addition of organic salts to PC provides limited improvement in flame retardancy in thicker samples, but the organic salts failed to provide adequate flame retardancy in thinner test samples.

CO35 alone exhibits excellent flame retardancy, V-0 under UL-94 conditions. The addition of organic salts improved the performance by decreasing dripping. Specifically, the dripping was reduced in samples including CO35 and Rimar salt (Sample 4) as compared to CO35 alone (Sample 3).

Example 3

Compounding of Random Copoly(Phosphonato-Carbonate) and PC

Various polymer compositions including polycarbonate (PC), random copolyphosphonate having 35 mol. % phosphonate (CO 35), and potassium perfluorobutane sulfonate (Rimar salt) or 3-Phenylsulfonylbenzenesulfonic acid potassium salt (KSS) were prepared. The various components were combined in the amounts provided in TABLE 5, and the compositions were compounded in Werner and Pfleider, ZS B25 extruder with regular PC screw configuration. Compounding conditions are set-forth in TABLE 2 above, and molding conditions are provided in TABLE 3 above. Data gathered from testing of these polymer compositions are provided in TABLE 5. Compositions including copoly (phosphonato-carbonate) and PC with KSS and Rimar salt show excellent flame retardancy (V-0 under UL-94), good mechanical properties (not shown), and decreased dripping. As such, these polymer compositions provide an improvement over the prior art.

TABLE 5

| Ingredient | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| PC - 121R | — | 25 | 50 | 75 | 100 | — | 24.92 | 49.92 | 74.92 | 99.92 | — | 24.92 | 49.92 | 74.92 | 99.92 |
| FRX CO35 | 100 | 75 | 50 | 25 | — | 99.92 | 75.00 | 50.00 | 25.00 | — | 99.92 | 75.00 | 50.00 | 25.00 | — |
| Rimar Salt | — | — | — | — | — | 0.08 | 0.08 | 0.08 | 0.08 | 0.08 | — | — | — | — | — |
| KSS | — | — | — | — | — | — | — | — | — | — | 0.08 | 0.08 | 0.08 | 0.08 | 0.08 |
| Total | 100 | 100 | 100 | 100 | 100 | 100 | 100 | 100 | 100 | 100 | 100 | 100 | 100 | 100 | 100 |
| UL94, 1.6 mm | | | | | | | | | | | | | | | |
| Max burn time (s) | 2 | 1 | 8 | NA | NA | 1 | 4 | 4 | 8 | 4 | 2 | 2 | 3 | 8 | NA |
| Total burn time (s) | 6 | 4 | 47 | NA | NA | <2 | 21 | 12 | 43 | 24 | 4 | 9 | 9 | 31 | NA |
| Drips 1st (#) | 0 | 0 | 0 | yes | yes | 0 | 0 | 0 | 5 | 0 | 0 | 0 | 0 | 1 | NA |
| Ign 1st (#) | 0 | 0 | 0 | 0 | 0 | 0 | 0 | 0 | 0 | 0 | 0 | 0 | 0 | 0 | 3 |
| Drips 2nd (#) | 9 | 2 | 5 | NA | NA | 9 | 9 | 8 | 10 | 6 | 9 | 7 | 7 | 9 | NA |
| Ign 2nd (#) | 0 | 0 | 0 | 3 | 3 | 0 | 0 | 0 | 0 | 0 | 0 | 0 | 0 | 0 | 1 |
| Rating | V0 | V0 | V0 | — | — | V0 | V0 | V0 | V0 | V0 | V0 | V0 | V0 | V0 | — |
| p(FTP) | 1.00 | 1.00 | 0.98 | — | — | 1.00 | 1.00 | 1.00 | 0.99 | 1.00 | 1.00 | 1.00 | 1.00 | 1.00 | — |
| UL94, 0.8 mm | | | | | | | | | | | | | | | |
| Max burn time (s) | 5 | 6 | 8 | NA | burn | 6 | 6 | 4 | NA | 3 | 4 | 4 | 6 | NA | |
| Total burn time (s) | 23 | 23 | 28 | NA | burn | 26 | 20 | 19 | NA | 15 | 17 | 18 | 22 | NA | |
| Drips 1st (#) | 0 | 4 | 1 | 4 | 0 | 1 | 3 | 3 | 5 | 0 | 3 | 2 | 1 | 5 | |
| Ign 1st (#) | 0 | 0 | 0 | 4 | 0 | 0 | 0 | 0 | 5 | 0 | 0 | 0 | 0 | 5 | |
| Drips 2nd (#) | 13 | 17 | 11 | 1 | | 12 | 6 | 6 | — | 9 | 17 | 11 | 7 | — | |
| Ign 2nd (#) | 0 | 0 | 0 | 1 | | 0 | 0 | 0 | — | 0 | 0 | 0 | 0 | — | |
| Rating | V0 | V0 | V0 | — | — | V0 | V0 | V0 | — | V0 | V0 | V0 | V0 | — | |
| UL94, 0.4 mm | | | | | | | | | | | | | | | |
| Max burn time (s) | 7 | 10 | 10 | burn | 6 | 6 | 4 | NA | 3 | 4 | 7 | NA | NA | | |
| Total burn time (s) | 26 | 44 | 46 | burn | 22 | 24 | 22 | NA | 12 | 22 | 28 | NA | NA | | |
| Drips 1st (#) | 11 | 5 | 7 | 0 | 6 | 5 | 3 | 5 | 5 | 12 | 6 | 4 | 5 | | |

TABLE 5-continued

| Ingredient | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| Ign 1st (#) | 0 | 0 | 0 | | 0 | 0 | 0 | 0 | 5 | 5 | 0 | 0 | 0 | 5 | |
| Drips 2nd (#) | 16 | 11 | 14 | | | 12 | 6 | 6 | — | NA | 17 | 16 | 5 | — | |
| Ign 2nd (#) | 0 | 0 | 0 | | | 0 | 0 | 0 | — | NA | 0 | 0 | 5 | — | |
| Rating | V0 | V0 | V0 | — | | V0 | V0 | V0 | — | V-2 | V0 | V0 | — | — | |

The invention claimed is:

1. An article of manufacture prepared from a polymer composition comprising
   one or more polyphosphonate or one or more copolyphosphonate; and
   one or more organic salts.

2. The article of manufacture of claim 1, wherein the article of manufacture comprises a coating or adhesive prepared from the polymer composition.

3. The article of manufacture of claim 1, comprising fabricate articles selected from the group consisting of free-standing films, prepregs, fibers, foams, molded articles, woven articles, non-woven articles and fiber reinforced composites.

4. The article of manufacture of claim 1, comprising support parts, electrical components, electrical connectors, electrical housings, electrical covers, electrical insulators, printed wiring laminated boards, housings, covers, brackets, support structures, enclosures, solid sheets, co-extruded sheets, and multi-wall sheets, and subcomponents and components in consumer products.

5. A method for preparing a polymer composition comprising compounding one or more polyphosphonate or one or more copolyphosphonate and one or more organic salts.

6. The method of claim 5, wherein compounding comprises melt compounding, melt extrusion, and combinations thereof.

7. The method of claim 5, wherein compounding is carried out at temperatures of about 200° C. to about 400° C.

8. The method of claim 5, further comprising mixing individual constituents of the polymer composition either successively or simultaneously.

9. The method of claim 5, further comprising molding the polymer composition.

* * * * *